United States Patent
Lee et al.

(10) Patent No.: US 9,408,276 B2
(45) Date of Patent: Aug. 2, 2016

(54) SHORT CIRCUIT DETECTION CIRCUIT AND CONTROL METHOD THEREOF

(71) Applicant: Leadtrend Technology Corp., Hsin-Chu (TW)

(72) Inventors: Ching-Tsan Lee, Hsin-Chu (TW); Pai-Feng Liu, Hsin-Chu (TW)

(73) Assignee: Leadtrend Technology Corp., Hsinchu County (TW)

( * ) Notice: Subject to any disclaimer, the term of this patent is extended or adjusted under 35 U.S.C. 154(b) by 433 days.

(21) Appl. No.: 13/705,190

(22) Filed: Dec. 5, 2012

(65) Prior Publication Data

US 2013/0147362 A1    Jun. 13, 2013

(30) Foreign Application Priority Data

Dec. 8, 2011  (TW) .............................. 100145228 A

(51) Int. Cl.
*H05B 37/02* (2006.01)
*H05B 33/08* (2006.01)

(52) U.S. Cl.
CPC .............. *H05B 37/02* (2013.01); *H05B 33/089* (2013.01); *Y02B 20/341* (2013.01)

(58) Field of Classification Search
CPC ........... H05B 33/0815; H05B 33/0818; H05B 33/0827; H05B 33/0851; H05B 33/089; H05B 33/083; H05B 33/0887; H05B 33/0821; H05B 33/0824; H05B 33/0884; H05B 33/0875; H05B 33/0878; Y02B 20/346; Y02B 20/347
USPC ............. 315/307, 224, 186, 185 R, 308, 192, 315/209 R, 123, 291; 345/102
See application file for complete search history.

(56) References Cited

U.S. PATENT DOCUMENTS

| | | | | |
|---|---|---|---|---|
| 7,830,094 | B2 * | 11/2010 | He et al. ........................ | 315/224 |
| 2007/0195025 | A1 * | 8/2007 | Korcharz et al. ............... | 345/82 |
| 2009/0289559 | A1 * | 11/2009 | Tanaka et al. ............. | 315/185 R |
| 2010/0219759 | A1 * | 9/2010 | Chen .............................. | 315/129 |
| 2011/0050131 | A1 * | 3/2011 | Je et al. ......................... | 315/297 |
| 2011/0062872 | A1 * | 3/2011 | Jin et al. ........................ | 315/122 |
| 2011/0068700 | A1 * | 3/2011 | Fan ........................... | 315/185 R |
| 2011/0273101 | A1 * | 11/2011 | Liu ................. | 315/192 |
| 2011/0291575 | A1 * | 12/2011 | Shiu et al. ..................... | 315/192 |
| 2012/0074868 | A1 * | 3/2012 | Tseng et al. .................. | 315/294 |
| 2012/0139421 | A1 * | 6/2012 | Lee ............................... | 315/122 |

FOREIGN PATENT DOCUMENTS

| | | |
|---|---|---|
| CN | 101534594 A | 9/2009 |
| CN | 101916547 A | 12/2010 |
| CN | 102026438 A | 4/2011 |
| WO | 2011014963 A1 | 2/2011 |

* cited by examiner

*Primary Examiner* — Thuy Vinh Tran
(74) *Attorney, Agent, or Firm* — Winston Hsu; Scott Margo

(57) ABSTRACT

A short circuit detection circuit for detecting short circuit of a series of light-emitting diodes includes a constant current source, a rectifier, and a detector. The constant circuit source provides a setting current. The rectifier is coupled between a feedback node and the constant current source. The feedback node is coupled to a terminal of the series of light-emitting diodes. When a feedback voltage of the feedback node exceeds a short reference voltage, the rectifier allows the setting current sinks the feedback node. The detector detects the feedback voltage of the feedback node. When the feedback voltage exceeds a predetermined value, short-circuit protection is triggered to make the series of light-emitting diodes be turned off.

7 Claims, 6 Drawing Sheets

SHORT CIRCUIT DETECTION CIRCUIT AND CONTROL METHOD THEREOF

BACKGROUND OF THE INVENTION

1. Field of the Invention

The present invention relates to a short circuit detection circuit and a control method, and particularly to a short circuit detection circuit and a control method that can be applied for detecting short circuit of a series of light-emitting diodes.

2. Description of the Prior Art

In an energy saving and carbon reduction era, a light-emitting diode can be used for a popular light source due to higher luminous efficiency and an smaller component size of the light-emitting diode. For example, liquid crystal panel manufacturers are gradually utilizing light-emitting diode light sources as a substitute for traditional cold-cathode fluorescent lamp light sources as backlight sources of liquid crystal panels.

FIG. 1 is a diagram illustrating a light-emitting diode power supply 8 applied as a backlight module of a liquid crystal panel. The light-emitting diode power supply 8 is mainly used for controlling turning-on of a plurality of series of light-emitting diodes $L_1$-$L_N$, where each series of light-emitting diodes of the plurality of series of light-emitting diodes $L_1$-$L_N$ has a plurality of light-emitting diodes. In a booster 4, a pulse width controller 23 can control a power switch to make an inductor component sink power from an input terminal IN and release power to an output terminal OUT. Thus, the booster 4 can build a proper output voltage $V_{OUT}$ at the output terminal OUT to drive the plurality of series of light-emitting diodes $L_1$-$L_N$. A current balance controller 13 controls current flowing through each series of light-emitting diodes to be the same to make luminance of each series of light-emitting diodes the same.

A circuit 12 has a plurality of diodes all coupled to a minimum voltage terminal MIN for detecting a minimum voltage of cathode terminals $D_1$-$D_N$. A voltage $V_{MIN}$ of the minimum voltage terminal MIN roughly corresponds to the minimum voltage of the cathode terminals $D_1$-$D_N$. In addition, the current balance controller 13 can also influence transmission efficiency of the burst circuit 4 through a control terminal CTRL to make the voltage $V_{MIN}$ maintain a predetermined voltage value. Thus, NMOS transistors $N_1$-$N_N$ can be ensured to operate in a more efficient state to reduce unnecessary power consumption.

Some light-emitting diodes of the plurality of series of light-emitting diodes $L_1$-$L_N$ may be aging, short circuit, or open circuit with increase in using time. When the plurality of series of light-emitting diodes $L_1$-$L_N$ have abnormal operational states, the current balance controller 13 should execute a corresponding operation to prevent the plurality of series of light-emitting diodes $L_1$-$L_N$ from being damaged.

A circuit 14 can provide short-circuit detection. The circuit 14 has a plurality of diodes all coupled to a maximum voltage terminal MAX. A voltage $V_{MAX}$ of the maximum voltage terminal MAX roughly corresponds to the maximum voltage of cathode terminals $D_1$-$D_N$. For example, if the series of light-emitting diodes $L_n$ has a plurality of light-emitting diodes that are short circuited, a cathode voltage $V_{Dn}$ of a cathode terminal $D_n$ is much higher than other cathode voltages $V_{D1}$-$V_{Dn-1}$ when the plurality of series of light-emitting diodes $L_1$-$L_N$ are turned on, resulting in the voltage $V_{MAX}$ of the maximum voltage terminal MAX being increased. The current balance controller 13 can detect the voltage $V_{MAX}$ through a detection terminal SD. Therefore, when the voltage $V_{MAX}$ exceeds a threshold value, the current balance controller 13 can determine that a light-emitting diode short circuit event occurs, and further turn off the plurality of series of light-emitting diodes $L_1$-$L_N$.

However, the light-emitting diode power supply 8 in FIG. 1 has disadvantages as follows:

First, the current balance controller 13 can not determine which one of the plurality of series of light-emitting diodes $L_1$-$L_N$ has a light-emitting diode short circuit event. That is to say, the current balance controller 13 still turns off all series of light-emitting diodes when only one series of light-emitting diodes $L_n$ has a light-emitting diode short circuit event. Second, cost of the light-emitting diode power supply 8 is very expensive. The light-emitting diode power supply 8 needs a high voltage switch coupled between the maximum voltage terminal MAX and the detection terminal SD to prevent high cathode voltages $V_{D1}$-$V_{DN}$ from being inputted to the current balance controller 13 when the plurality of series of light-emitting diodes $L_1$-$L_N$ are turned off (dimming off). Thus, the current balance controller 13 needs an additional pin DT to control the high voltage switch.

SUMMARY OF THE INVENTION

An embodiment provides a control method for detecting short circuit of a series of light-emitting diodes. The control method includes providing a feedback terminal coupled to a terminal of the series of light-emitting diodes; sinking reference current from the feedback terminal to make a feedback voltage be not higher than a short circuit reference voltage, wherein the reference current has a predetermined maximum value; comparing feedback current with the reference current when the series of light-emitting diodes are turned on, wherein the feedback current flows from the terminal of the series of light-emitting diodes to the feedback terminal; and triggering short-circuit protection to make the series of light-emitting diodes be turned off when the feedback current is higher than the reference current.

Another embodiment provides a short circuit detection circuit for detecting short circuit of a series of light-emitting diodes. The short circuit detection circuit includes a constant current source, a rectifier, and a detector. The constant current source provides setting current. The rectifier is coupled between a feedback terminal and a constant current source. The feedback terminal is coupled to a terminal of the series of light-emitting diodes. When a feedback voltage of the feedback terminal exceeds a short circuit reference voltage, the rectifier make the setting current sink the feedback terminal. The detector detects the feedback voltage of the feedback terminal, and triggers a short-circuit protection to make the series of light-emitting diodes be turned off when the feedback voltage is higher than a predetermined value.

These and other objectives of the present invention will no doubt become obvious to those of ordinary skill in the art after reading the following detailed description of the preferred embodiment that is illustrated in the various figures and drawings.

DETAILED DESCRIPTION

Figure 2:
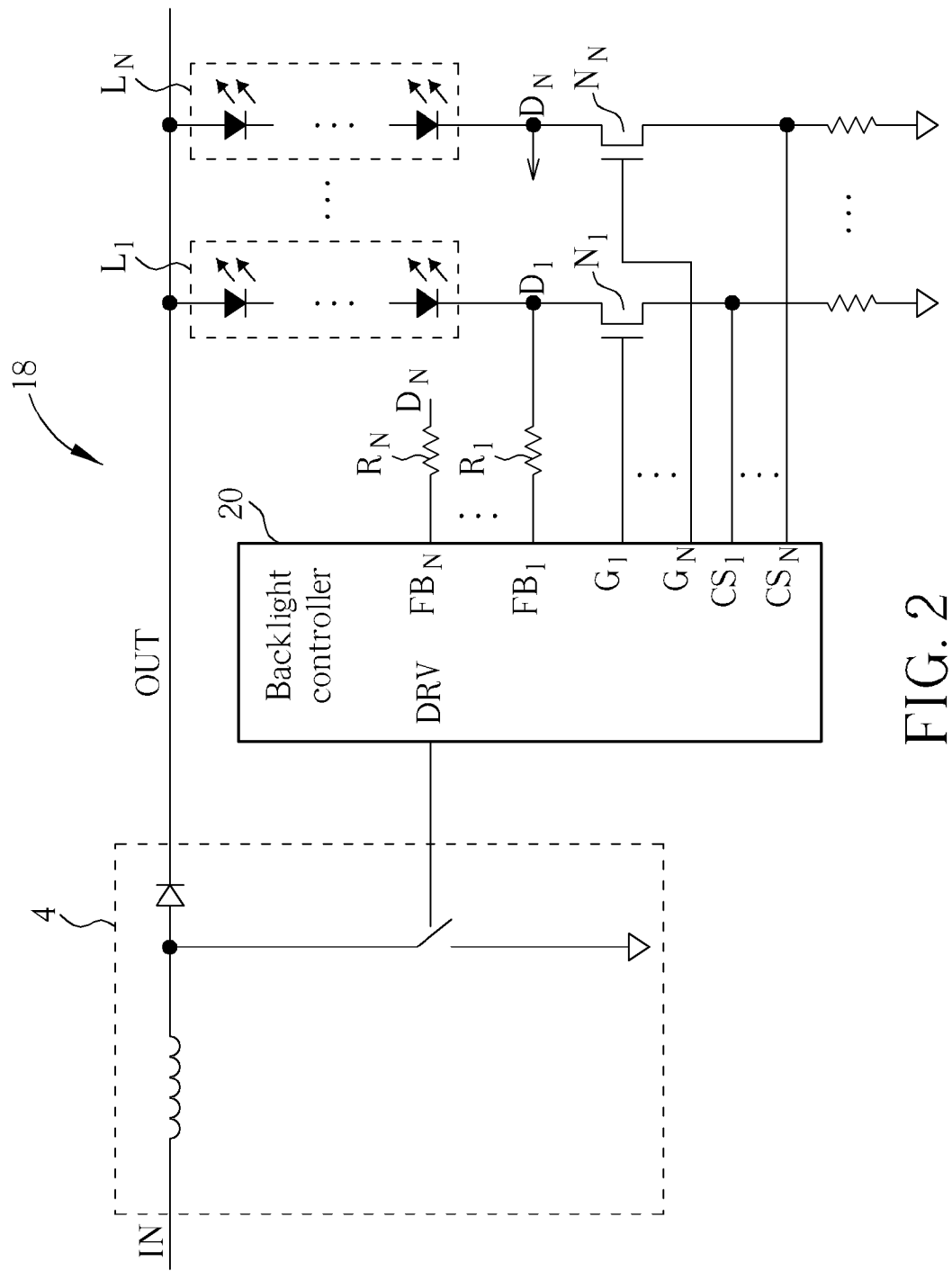
FIG. 2 is a diagram illustrating a power control circuit for controlling turning-on of a plurality of series of light-emitting diodes according to an embodiment.

FIG. 2 is a diagram illustrating a power control circuit 18 for controlling turning-on of a plurality of series of light-emitting diodes $L_1$-$L_N$ according to an embodiment. The plurality of series of light-emitting diodes $L_1$-$L_N$ have cathode terminals $D_1$-$D_N$ coupled to feedback terminals $FB_1$-$FB_N$ of a backlight controller 20 through resistors $R_1$-$R_N$, respectively. The backlight controller 20 controls NMOS transistors $N_1$-$N_N$ through gate terminals $G_1$-$G_N$, and roughly detects currents flowing through the NMOS transistors $N_1$-$N_N$ through current detection terminals $CS_1$-$CS_N$. The backlight controller 20 also controls a power switch of a booster 4 through a driving terminal DRV to store energy/release energy in/from an inductor of the booster 4. In another embodiment of the present invention, the backlight controller 20 is a monolithic integrated circuit.

Figure 3:
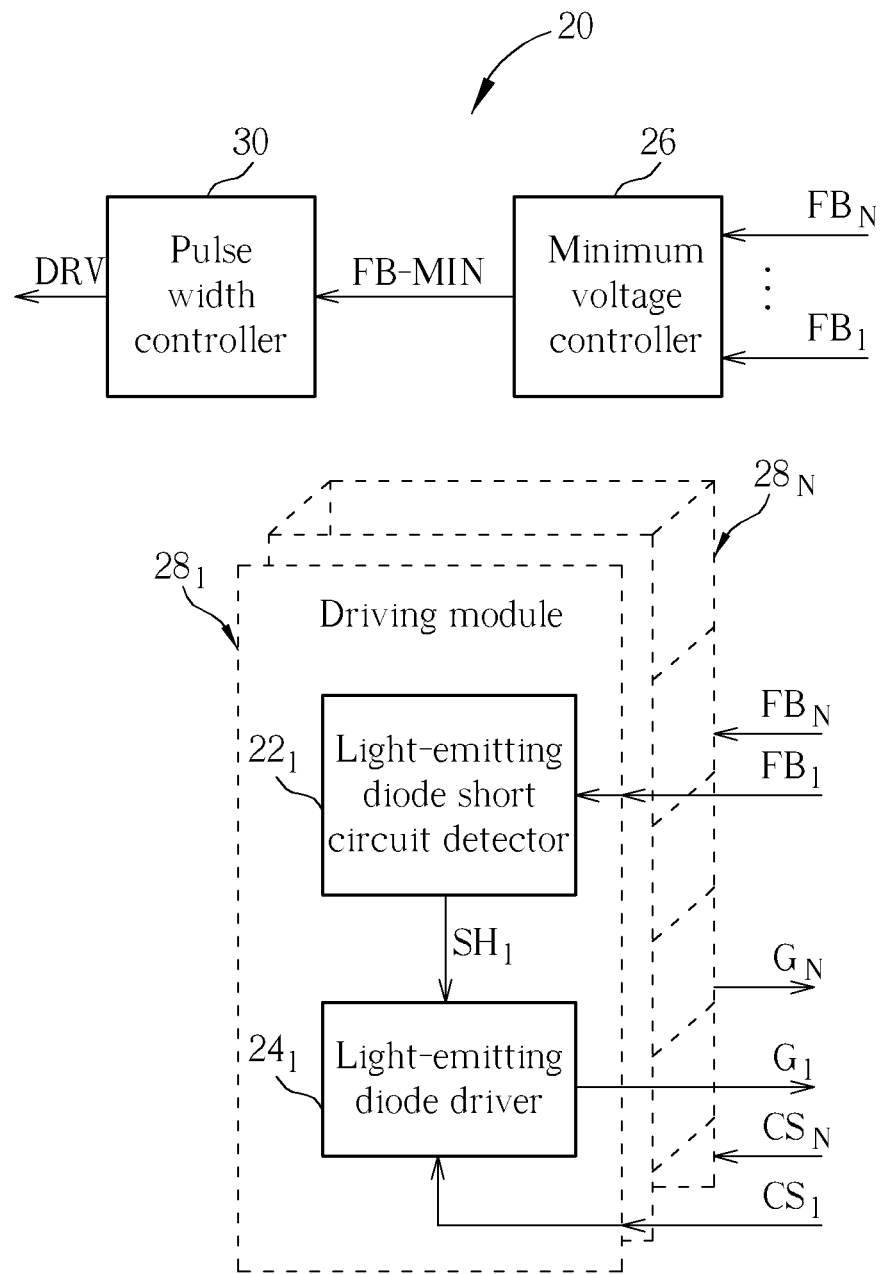
FIG. 3 is a diagram illustrating the backlight controller in FIG. 2.

FIG. 3 is a diagram illustrating the backlight controller 20 in FIG. 2. The backlight controller 20 includes a pulse width controller 30, a minimum voltage controller 26, and a plurality of driving modules $28_1$-$28_N$.

The minimum voltage controller 26 generates a minimum feedback voltage $V_{FB-MIN}$ at a minimum feedback terminal FB-MIN according to a minimum value of feedback voltages $V_{FB1}$-$V_{FBN}$ of the feedback terminals $FB_1$-$FB_N$. The pulse width controller 30 controls the power switch of the booster 4 through the driving terminal DRV to make a voltage $V_{OUT}$ of an output terminal OUT be increased or decreased to make the minimum feedback voltage $V_{FB-MIN}$ roughly maintain a predetermined value. Thus, the NMOS transistors $N_1$-$N_N$ can operate more efficiently. For example, the pulse width controller 30 can maintain the minimum feedback voltage $V_{FB-MIN}$ at about 1V, and similarly the minimum value of the feedback voltages $V_{FB1}$-$V_{FBN}$ may be about 1V.

The driving modules $28_1$-$28_N$ correspond to the plurality of series of light-emitting diodes $L_1$-$L_N$, respectively. Circuits, structures and functions of the driving modules $28_1$-$28_N$ are the same or similar. Taking the driving modules $28_1$ for example as follows, those skilled in the art can simply infer or implement inner structures, coupling relationships, and functions of the driving modules $28_2$-$28_N$ according to description of the driving module $28_1$.

Figure 4:
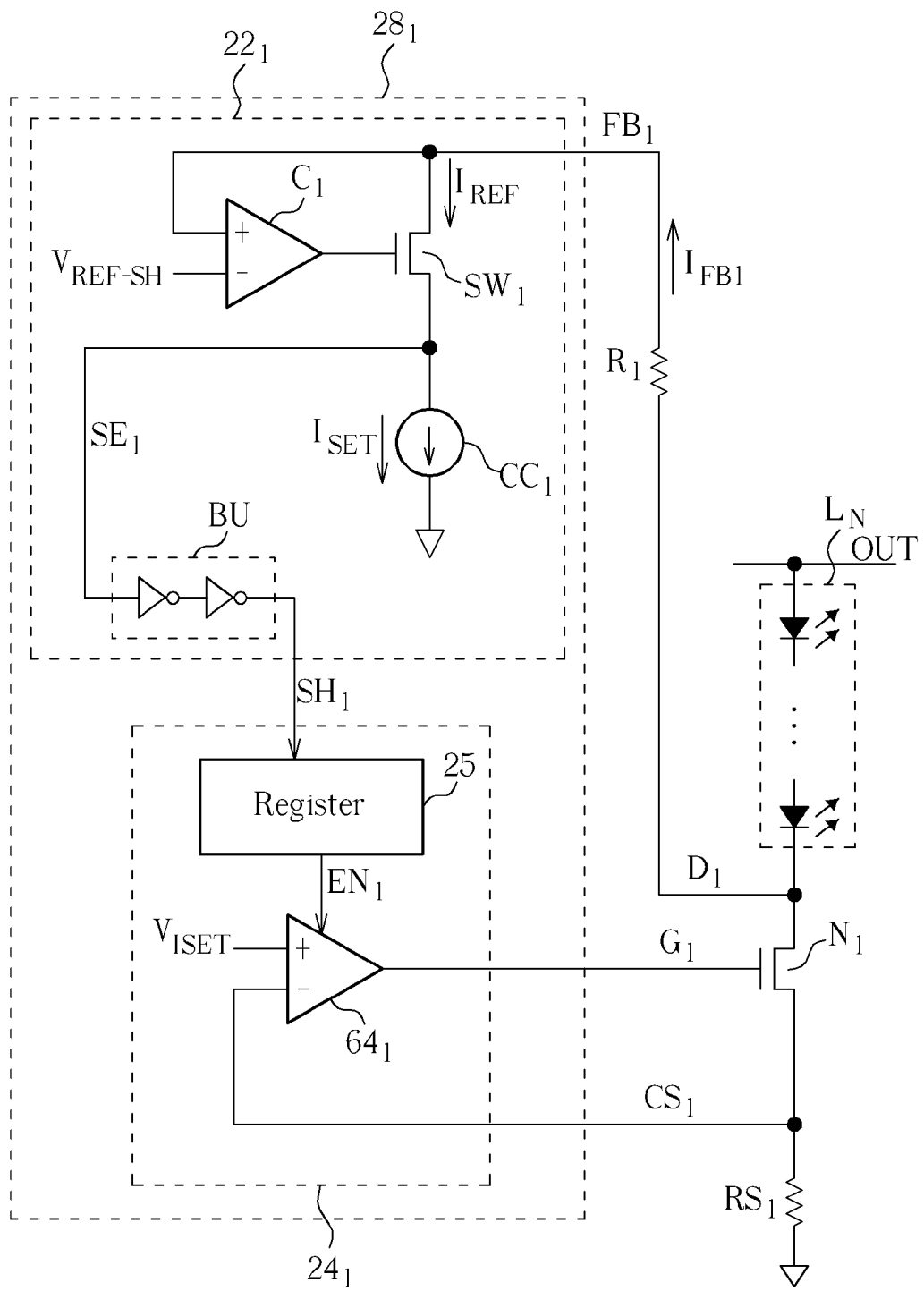
FIG. 4 is a diagram illustrating the driving module and corresponding circuits thereof.

FIG. 4 is a diagram illustrating the driving module $28_1$ and corresponding circuits thereof, which includes a light-emitting diode short circuit detector $22_1$ and a light-emitting diode driver $24_1$.

The light-emitting diode driver $24_1$ roughly makes current flowing through the series of light-emitting diodes $L_1$ be a predetermined current value through the gate terminal $G_1$ and the current detection terminal $CS_1$ when the series of light-emitting diodes $L_1$ is turned on. Due to a negative feedback mechanism provided by an operational amplifier $64_1$, the current flowing through the series of light-emitting diodes $L_1$ can be roughly equal to a setting voltage $V_{ISET}$ divided by a resistance of the detection resistor $RS_1$. Because the setting voltages $V_{ISET}$ in the driving modules $28_1$-$28_N$ are the same, the currents flowing through the plurality of series of light-emitting diodes $L_1$-$L_N$ are the same if the detection resistors $RS_1$-$RS_N$ are the same. Thus, luminances of the plurality of series of light-emitting diodes $L_1$-$L_N$ are roughly the same.

The light-emitting diode short circuit detector $22_1$ coupled to the feedback terminal $FB_1$ can determine whether the series of light-emitting diodes $L_1$ has a light-emitting diode short circuit event when the series of light-emitting diodes $L_1$ is turned on. If the light-emitting diode short circuit detector $22_1$ determines that the series of light-emitting diodes $L_1$ has the light-emitting diode short circuit event, the light-emitting diode short circuit detector $22_1$ forces disabling of the light-emitting diode driver $24_1$ through a signal $SH_1$. Meanwhile, a register 25 can disable the operational amplifier $64_1$ to turn off the NMOS transistors $N_1$ to make the series of light-emitting diodes $L_1$ be turned off.

In the light-emitting diode short circuit detector $22_1$, a comparator $C_1$ compares the feedback voltage $V_{FB1}$ of the feedback terminal $FB_1$ with a short circuit reference voltage $V_{REF-SH}$. A constant current source $CC_1$ is coupled to a switch $SW_1$ and a buffer BU through a detection terminal $SE_1$. If the feedback voltage $V_{FB1}$ is higher than the short circuit reference voltage $V_{REF-SH}$, the switch $SW_1$ is turned on. Thus, a part of a setting current $I_{SET}$ provided by the constant current source $CC_1$ becomes a reference current $I_{REF}$ which sinks current flowing from the feedback terminal $FB_1$ to the switch $SW_1$ to decrease the feedback voltage $V_{FB1}$. Therefore, a maximum of the reference current $I_{REF}$ is the setting current $I_{SET}$. That is to say, if a current $I_{FB1}$ flowing through the resistor $R_1$ to the feedback terminal $FB_1$ is not greater than the setting current $I_{SET}$, the feedback voltage $V_{FB1}$ can be roughly maintained in a range lower than the short circuit reference voltage $V_{REF-SH}$; if the current $I_{FB1}$ is smaller than the setting current $I_{SET}$, a voltage of the detection terminal $SE_1$ can be maintained at a low voltage level (such as 0V) which can be regarded as a logic "0". Meanwhile, the buffer BU maintains the signal $SH_1$ at the logic "0", so the light-emitting diode driver $24_1$ can drive the series of light-emitting diodes $L_1$ to be turned on.

On the other hand, when the feedback voltage $V_{FB1}$ is lower than the short circuit reference voltage $V_{REF-SH}$, the current $I_{FB1}$ is about equal to 0, so the feedback voltage $V_{FB1}$ is roughly equal to a cathode voltage $V_{D1}$. Thus, pulse width controller 30 and the minimum voltage controller 26 in FIG. 3 can operate normally.

When the current $I_{FB1}$ is greater than the setting current $I_{SET}$, the feedback voltage $V_{FB1}$ exceeds the short circuit reference voltage $V_{REF-SH}$. Meanwhile, the switch $SW_1$ is turned on completely (fully-ON), and the voltage of the detection terminal $SE_1$ is roughly equal to the feedback voltage $V_{FB1}$. Therefore, the buffer BU acts as a detector to detect the voltage of the detection terminal $SE_1$ (that is, to detect the feedback voltage $V_{FB1}$). If the voltage of the detection terminal $SE_1$ is higher than a threshold value $V_{TH}$ (such as 3V), the buffer BU may regard the voltage of the detection terminal $SE_1$ as a logic "1", and the buffer BU can output the signal $SH_1$ with the logic "1". Thus, it is considered that the series of light-emitting diodes $L_1$ has the light-emitting diode short circuit event. Meanwhile, the light-emitting diode driver $24_1$ can be forced to be disabled to roughly make the series of light-emitting diodes $L_1$ be turned off.

In one embodiment of the present invention, the short circuit reference voltage $V_{REF-SH}$ is higher than the threshold value $V_{TH}$ which is utilized to determine the logic "1" or the logic "0" by the buffer BU. Thus, when the series of light-emitting diodes $L_1$ is regarded to have the light-emitting diode short circuit event, relationships among the setting current $I_{SET}$, the short circuit reference voltage $V_{RES-SH}$, a trigger cathode voltage $V_{D1-TH}$, and the resistor $R_1$ can be determined according to equation I:

$$I_{SET} = I_{FB1} = (V_{D1-TH} - V_{REF-SH})/R_1 \qquad \text{I}$$

Rearrangement of equation I generates equation II as:

$$R_1 = (V_{D1-TH} - V_{REF-SH})/I_{SET} \qquad \text{II}$$

As shown in equation II, the trigger cathode voltage $V_{D1-TH}$ can be set when the series of light-emitting diodes $L_1$ has the light-emitting diode short circuit event through selection of the proper resistor $R_1$. For example, when the pulse width controller 30 operates normally, the minimum value of the feedback voltage $V_{FB1}$-$V_{FBN}$ (equal to the minimum value of the cathode voltage $V_{D1}$-$V_{DN}$) is roughly maintained at 1V; number of light-emitting diodes of each series of light-emitting diodes is the same; a voltage drop of each light-emitting diode is roughly equal to 3.5V when each light-emitting diode operates normally; the setting current $I_{SET}$ is equal to 20 uA; the short circuit reference voltage $V_{RES-SH}$ is 4V; the threshold value $V_{TH}$ is 3V; and the series of light-emitting diodes $L_1$ is regarded as having the light-emitting diode short circuit event when at least three light-emitting diodes are shorted. Thus, the trigger cathode voltage $V_{D1-TH}$ should be equal to 11.5 (=3.5*3+1) V, the resistor $R_1$ should be determined to be (11.5−4)/20 MΩ.

In another embodiment of the present invention, the short circuit reference voltage $V_{REF-SH}$ is lower than the threshold value $V_{TH}$ which is utilized to determine the logic "1" or the logic "0" by the buffer BU. Thus, only the short circuit reference voltage $V_{REF-SH}$ is replaced with the threshold value $V_{TH}$ in equation I and equation II, and equation for selecting the proper resistor $R_1$ can be obtained.

The driving module $28_1$ in FIG. 4 can determine whether the series of light-emitting diodes $L_1$ has the light-emitting diode short circuit event. And, operation of light-emitting diode short circuit detectors of other driving modules is not influenced after the light-emitting diode short circuit detector $22_1$ disables the light-emitting diode driver $24_1$.

Figure 5:
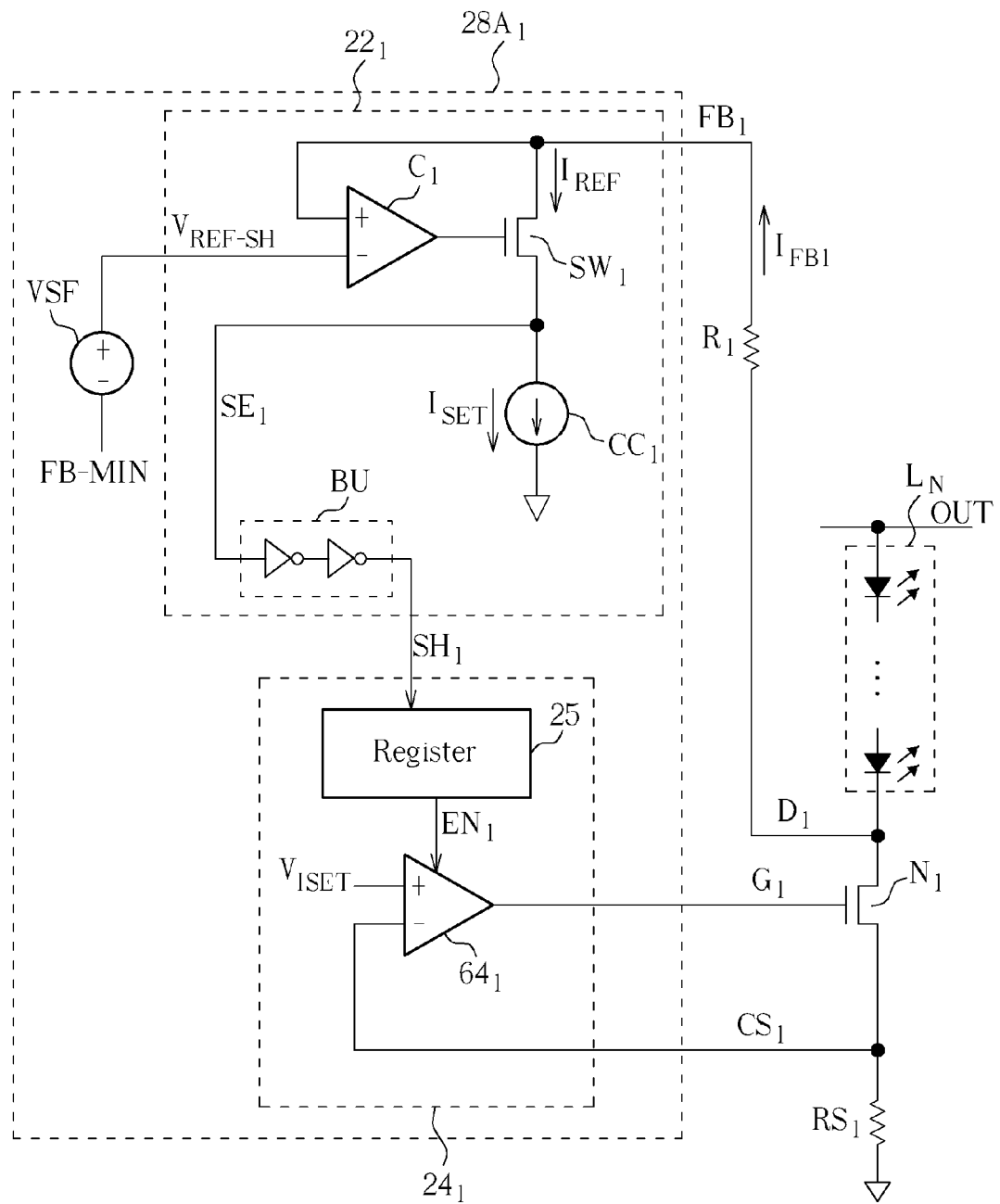
FIG. 5 is a diagram illustrating a driving module instead of the driving module in FIG. 3.

FIG. 5 is a diagram illustrating a driving module $28A_1$ instead of the driving module $28_1$ in FIG. 3. A difference between the driving module $28_1$ and the driving module $28A_1$ is that a short circuit reference voltage $V_{REF-SH}$ of the driving module $28A_1$ corresponds to the minimum feedback voltage $V_{FB-MIN}$ which corresponds to a minimum value of the cathode voltage $V_{D1}$-$V_{DN}$, where the short circuit reference voltage $V_{REF-SH}$ of the driving modules $28_1$ is fixed. In FIG. 5, a constant voltage source VSF adds a predetermined voltage to the minimum feedback voltage $V_{FB-MIN}$ of the feedback terminal FB-MIN to act as the short circuit reference voltage $V_{REF-SH}$.

In FIG. 4 and FIG. 5, the comparator $C_1$ and the switch $SW_1$ can be regarded as a rectifier. When the feedback voltage $V_{FB1}$ of the feedback terminal $FB_1$ exceeds the short circuit reference voltage $V_{REF-SH}$, the rectifier is turned on, and the setting current $I_{SET}$ sinks the feedback terminal $FB_1$. When the feedback voltage $V_{FB1}$ of the feedback terminal $FB_1$ is lower than the short circuit reference voltage $V_{REF-SH}$, the rectifier is turned off, and the setting current $I_{SET}$ can not sink the feedback terminal $FB_1$. Therefore, the threshold voltage of the rectifier is the short circuit reference voltage $V_{REF-SH}$.

Figure 6A:
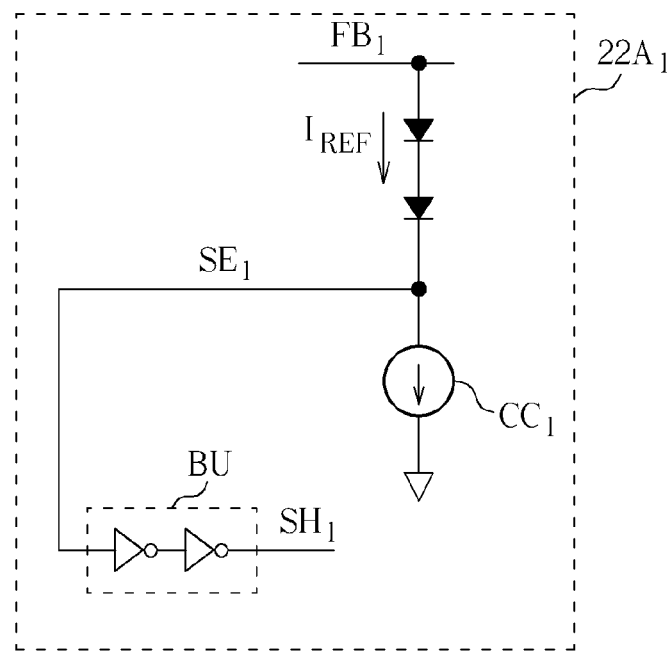
FIG. 6A and FIG. 6B are diagrams illustrating light-emitting diode short circuit detectors according to another embodiment.
Figure 6B:
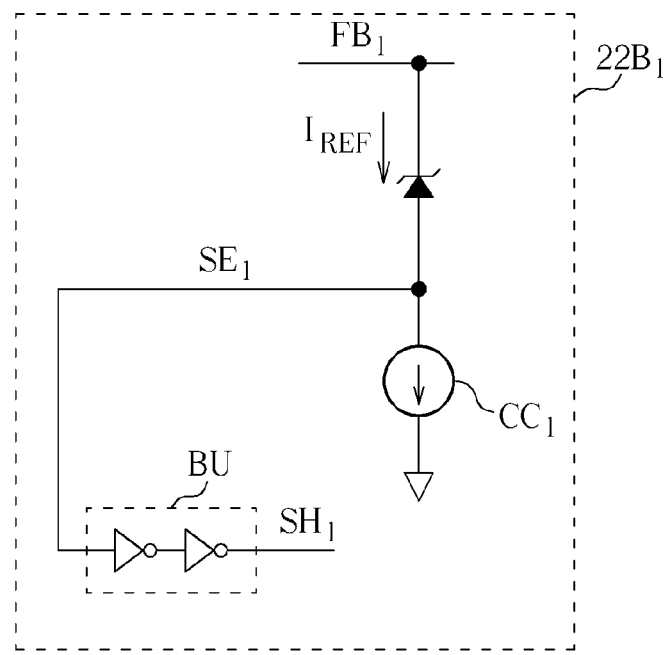

FIG. 6A and FIG. 6B are diagrams illustrating light-emitting diode short circuit detectors $22A_1$ and $22B_1$ according to another embodiment, where each of the light-emitting diode short circuit detectors $22A_1$ and $22B_1$ can substitute for light-emitting diode short circuit detector $22_1$ in FIG. 4. In FIG. 6A, a plurality of diodes are electrically connected in series between the feedback terminal $FB_1$ and the detection terminal $SE_1$. An equivalent threshold voltage of the plurality of diodes electrically connected in series is equal to a sum of a threshold voltage of each diode of the plurality of diodes. Therefore, the equivalent threshold voltage can act as a short circuit reference voltage. For example, in FIG. 6A, the equivalent threshold voltage of the plurality of diodes is 3V, so the setting current $I_{SET}$ can sink the feedback terminal $FB_1$ when the feedback voltage $V_{FB1}$ of the feedback terminal $FB_1$ exceeds 3V. Further, subsequent operational principles of the light-emitting diode short circuit detector $22A_1$ in FIG. 6A are the same as those of the light-emitting diode short circuit detector $22_1$ in FIG. 4A, so further description thereof is omitted for simplicity. The light-emitting diode short circuit detector $22B_1$ in FIG. 6B utilizes a zener diode to substitute for the plurality of diodes in FIG. 6A. A breakdown voltage of the zener diode can also act as a short circuit reference voltage. Those skilled in the art can realize operational principles of the light-emitting diode short circuit detector $22B_1$ in FIG. 6B according to the above mentioned description, so further description thereof is omitted for simplicity.

In another embodiment of the present invention, a zener diode is coupled between the feedback terminal $FB_1$ in FIG. 4 and ground for clamping a maximum voltage of the feedback terminal $FB_1$ to prevent other components from being damaged by a high voltage stress. Thus, the backlight controller 20 can be formed on a monolithic integrated circuit through a low voltage process to reduce cost of the backlight controller 20.

Figure 1:
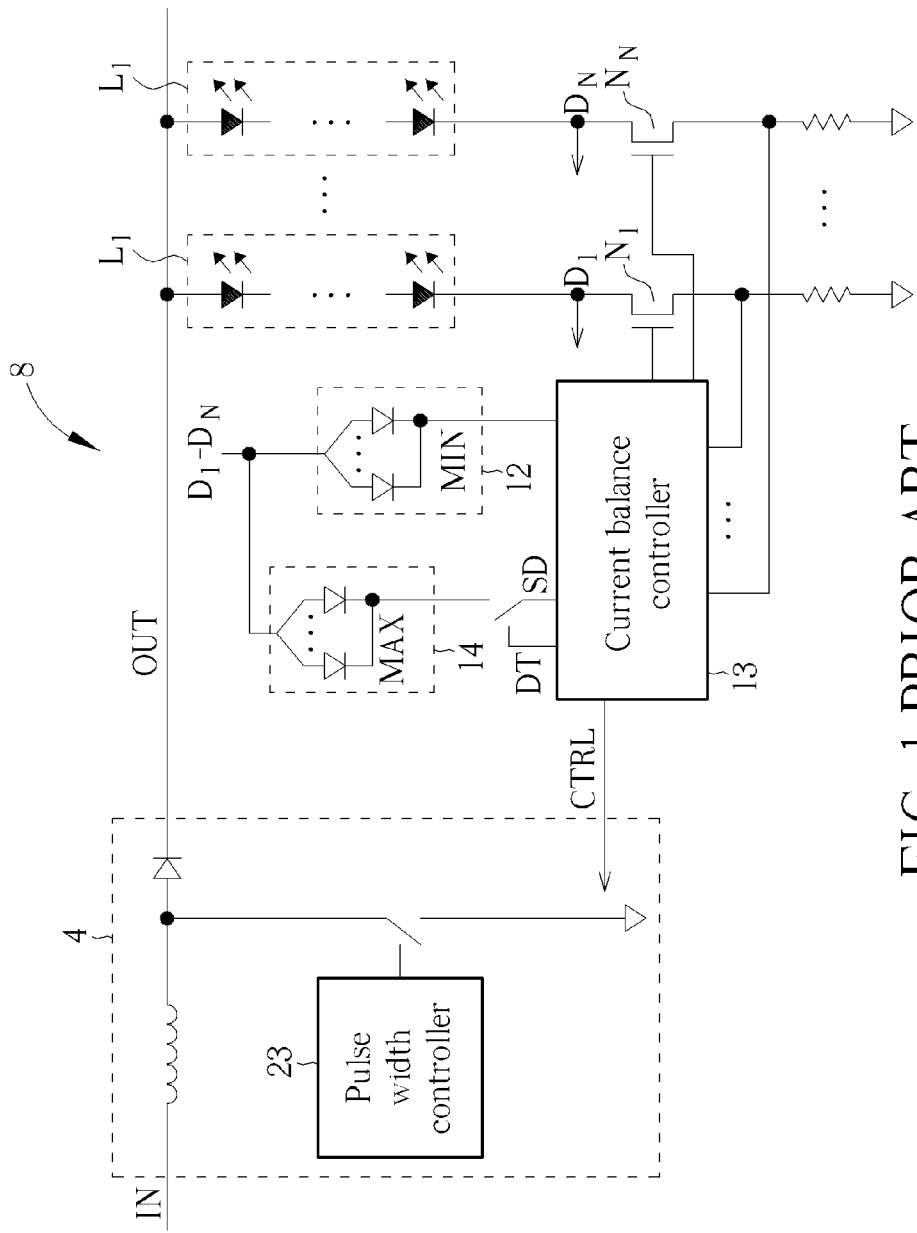
FIG. 1 is a diagram illustrating a light-emitting diode power supply applied for a backlight module of a liquid crystal panel.

To sum up, compared to the light-emitting diode power supply 8 in FIG. 1, the power control circuit 18 in FIG. 2 does not need high voltage components, so cost of the power control circuit 18 not only cheaper, but the backlight controller 20 in FIG. 2 can also independently detect short circuit events of different series of light-emitting diodes.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A short circuit detection circuit for detecting short circuit of a series of light-emitting diodes, the short circuit detection circuit comprising:
    a constant current source for providing setting current;
    a rectifier coupled between a feedback terminal and the constant current source, wherein the feedback terminal is coupled to a terminal of the series of light-emitting diodes for making the setting current sink the feedback terminal when a feedback voltage of the feedback terminal exceeds a short circuit reference voltage; and
    a detector for detecting the feedback voltage of the feedback terminal, and triggering short-circuit protection to make the series of light-emitting diodes be turned off when the feedback voltage is higher than a predetermined value.

2. The short circuit detection circuit of claim 1, wherein the rectifier comprises:
    a comparator having two input terminals coupled to the short circuit reference voltage and the feedback terminal, respectively; and
    a switch coupled between the feedback terminal and a monitor terminal, wherein the switch has a control terminal coupled to an output terminal of the comparator; wherein the constant current source is coupled to the monitor terminal.

3. The short circuit detection circuit of claim 2, wherein the detector coupled to the monitor terminal detects the feedback voltage through the switch.

4. The short circuit detection circuit of claim 1, wherein the rectifier comprises:
   a series of diodes having a threshold voltage which is about equal to the short circuit reference voltage.

5. The short circuit detection circuit of claim 1, wherein the rectifier comprises:
   a zener diode having a threshold voltage which is about equal to the short circuit reference voltage.

6. A power control circuit for controlling turning-on of a plurality of series of light-emitting diodes, the power control circuit comprising:
   a plurality of short circuit detection circuits coupled to a plurality of series of light-emitting diodes through a plurality of feedback terminals, wherein each of the plurality of short circuit detection circuits comprises:
      a constant current source for providing setting current;
      a rectifier coupled between a feedback terminal of the plurality of feedback terminals and the constant current source, wherein the feedback terminal is coupled to a terminal of a series of light-emitting diodes of the plurality of series of light-emitting diodes for making the setting current sink the feedback terminal when a feedback voltage of the feedback terminal exceeds a short circuit reference voltage; and
      a detector for detecting the feedback voltage of the feedback terminal, and triggering short-circuit protection to make the series of light-emitting diodes be turned off when the feedback voltage is higher than a predetermined value;
   a minimum value detector coupled to the plurality of feedback terminals to provide a lowest feedback voltage; and
   a conversion controller controlling power conversion of a power converter according to the lowest feedback voltage.

7. The power control circuit of claim 6, further comprising:
   a reference voltage generator for providing the short circuit reference voltage to each short circuit detection circuit of the plurality of short circuit detection circuits according to the lowest feedback voltage.

\* \* \* \* \*